US011853272B2

(12) United States Patent
Hiremath et al.

(10) Patent No.: US 11,853,272 B2
(45) Date of Patent: Dec. 26, 2023

(54) GOVERNANCE BASED VALIDATION FRAMEWORK FOR JSON DATA USING MACHINE LEARNING

(71) Applicant: INTERNATIONAL BUSINESS MACHINES CORPORATION, Armonk, NY (US)

(72) Inventors: Pushpalatha M Hiremath, Bangalore (IN); Soma Shekar Naganna, Bangalore (IN); Mohammad Khatibi, Richmond Hill (CA); Mark Wang, Vaughan (CA)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 17/249,077

(22) Filed: Feb. 19, 2021

(65) Prior Publication Data
US 2022/0269654 A1   Aug. 25, 2022

(51) Int. Cl.
| | | |
|---|---|---|
| *G06F 16/00* | (2019.01) | |
| *G06F 16/21* | (2019.01) | |
| *G06F 16/28* | (2019.01) | |
| *G06N 20/00* | (2019.01) | |
| *G06F 18/214* | (2023.01) | |

(52) U.S. Cl.
CPC .......... *G06F 16/213* (2019.01); *G06F 16/288* (2019.01); *G06F 18/2155* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 8,515,999 B2 | 8/2013 | De Cerqueira Gatti | |
| 8,745,718 B1 | 6/2014 | Dufel | |
| 8,756,617 B1 | 6/2014 | Boodman | |
| 10,693,901 B1* | 6/2020 | Chan | H04L 67/02 |
| 2007/0204214 A1* | 8/2007 | Gaurav | G06F 40/143 |
| | | | 707/999.102 |
| 2013/0019314 A1* | 1/2013 | Ji | H04L 63/168 |
| | | | 726/25 |
| 2016/0358101 A1* | 12/2016 | Bowers | G06N 20/00 |
| 2016/0358102 A1* | 12/2016 | Bowers | G06N 20/00 |
| 2016/0358103 A1* | 12/2016 | Bowers | G06F 9/4881 |

(Continued)

OTHER PUBLICATIONS

Microservices validation: Mjolnirr platform case study, IEEE, Savchenko et al., (Year: 2015).*

(Continued)

*Primary Examiner* — Jean M Corrielus
(74) *Attorney, Agent, or Firm* — L. Jeffrey Kelly; Elliot J. Shine

(57) ABSTRACT

A method, a computer system, and a computer program product for data validation in a microservice environment is provided. Embodiments of the present invention may include receiving a request based on an application configuration validation. Embodiments of the present invention may include determining a schema is not defined based on the request. Embodiments of the present invention may include generating the schema using machine learning. Embodiments of the present invention may include using the generated schema for a plurality of validations.

18 Claims, 7 Drawing Sheets

(56) References Cited

U.S. PATENT DOCUMENTS

| | | |
|---|---|---|
| 2017/0206256 A1 | 7/2017 | Tsirogiannis |
| 2018/0246984 A1 | 8/2018 | Kamiya et al. |
| 2019/0050756 A1* | 2/2019 | Dirac ................. G06N 20/00 |
| 2019/0095516 A1* | 3/2019 | Srinivasan ............ H04L 63/102 |
| 2019/0155894 A1* | 5/2019 | Gandhi ................. G06F 40/106 |
| 2019/0325353 A1* | 10/2019 | Aftab ................. G06F 8/30 |
| 2019/0370263 A1* | 12/2019 | Nucci ................. G06F 16/254 |
| 2019/0394083 A1* | 12/2019 | Sglavo ............... G06F 11/1448 |
| 2020/0037789 A1* | 2/2020 | Voelker ............... A47G 1/1606 |
| 2020/0257700 A1* | 8/2020 | Xu .................... G06F 8/65 |
| 2020/0272912 A1* | 8/2020 | Chacko ................ G06F 9/547 |
| 2021/0019284 A1* | 1/2021 | Bowman ............... G06F 9/5072 |
| 2021/0234833 A1* | 7/2021 | Schneider ............. G06N 20/00 |

OTHER PUBLICATIONS

Amazon Web Services, Inc., "Amazon Machine Learning: Developer Guide", https://docs.aws.amazon.com/machine-learning/latest/dg/machinelearning-dg.pdf, 2020, pp. 1-145.

Disclosed Anonymously, "Methodology for Performing Machine Learning on Database Data in a SQL Statement", https://priorart.ip.com/IPCOM/000252457, Jan. 13, 2018, pp. 1-4.

Jana, "How to Automate REST API JSON Schema Validation testing using Postman", http://www.adeveloperdiary.com/java/webservice/rest/how-to-automate-rest-api-schema-validation-testing-using-postman/, Jan. 24, 2018, pp. 1-16.

Simone, "Using JSON Schema to Validate Web Service Requests", https://techblog.constantcontact.com/api/using-son-schema-to-validate-web-service-requests/, Feb. 4, 2015, pp. 1-5.

Vogel, "Validating JSON with JSON Schema", https://visualstudiomagazine.com/articles/2018/02/01/validating-json.aspx, Feb. 13, 2018, pp. 1-8.

Mell et al., "The NIST Definition of Cloud Computing", Recommendations of the National Institute of Standards and Technology, Special Publication 800-145, Sep. 2011, 7 pages.

* cited by examiner

GOVERNANCE BASED VALIDATION FRAMEWORK FOR JSON DATA USING MACHINE LEARNING

BACKGROUND

The present invention relates generally to the field of computing, and more particularly to data validation and microservice frameworks. Data formats, such as JavaScript Object Notation (JSON), are an open standard file format that can be used to for storing data and exchanging data between many application services and microservices. JSON is widely used for sharing data of any size and format, however, is vulnerable when used by untrusted services.

SUMMARY

Embodiments of the present invention disclose a method, a computer system, and a computer program product for data validation in a microservice environment. Embodiments of the present invention may include receiving a request based on an application configuration validation. Embodiments of the present invention may include determining a schema is not defined based on the request. Embodiments of the present invention may include generating the schema using machine learning. Embodiments of the present invention may include using the generated schema for a plurality of validations.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
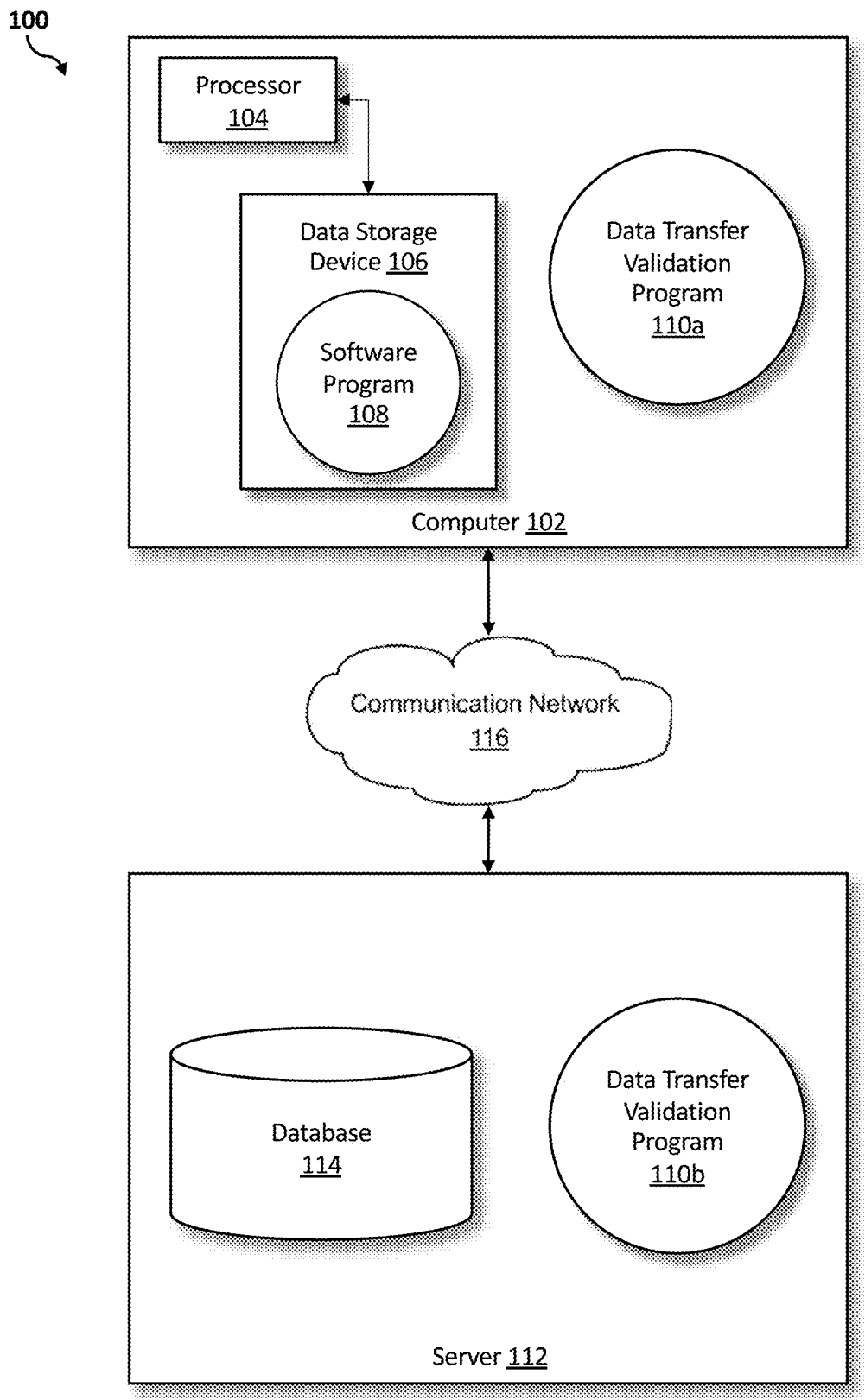
FIG. 1 illustrates a networked computer environment according to at least one embodiment.

Detailed embodiments of the claimed structures and methods are disclosed herein, however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, data formats, such as JavaScript Object Notation (JSON), are an open standard file format that can be used to for storing data and exchanging data between many application services and microservices. JSON is widely used for sharing data of any size and format, however, is vulnerable to attacks when used by untrusted services or untrusted browsers. One major security threat when using JSON includes allowing any kind of executable script injection. For example, representational state transfer (REST) used with JSON may not impose any strict rules on the data being exchanged. The server and the client may know the data being exchanged and the context of the data, however, the open file format can create a vulnerability when the client is transferring sensitive data to an application server. Additionally, the client's data may be transmitted through many servers or services in one application interaction. Therefore, validation becomes critical and costly when securing the sensitive data being transmitted between multiple services.

Microservice architecture contains multiple services and microservices that are leveraged in each application. Users that access the one or more services can have sensitive data compromised without proper data validation processes and proper architecture to support the validation process. Additionally, mobile device management platforms that are used, for example using a JSON based payload, may use hard coded validation that can become ineffective when managing customer or healthcare information. The hard coded validation can become ineffective when the platform is customized for augmentation of domain attributes. Additionally, ineffectiveness may stem from each microservice being required to execute a complete validation process even if one minor error causes a failure to validate. Including a complete validation process with the data associated with the validation process in each microservice will consume a large amount of space in the microservice architecture or container architecture. Including the complete validation process with the data associated with the validation process can also substantially affect the microservice architecture maintenance.

Validating the data being transmitted between users and services can be expensive and can impact performance. The validation process can prevent the application and transmitted data from being accessed by hackers. Adding validation can also eliminate injection attacks that inject untrusted data into a program. Therefore, it may be advantageous to, among other things, create a validation framework and a validation process to provide validation support during runtime.

The following described exemplary embodiments provide a system, a method and a program product for data validation in a microservice framework. As such, embodiments of the present invention have the capacity to improve the technical field of data validation by creating a validation framework and validation process to provide all required validation support, including custom validation injections, during runtime. The described exemplary embodiments provide dynamic validation processes based on machine learning. Additionally, an option includes to not require validation again, after the first validation process, if the validation request is being received from a trusted microservice. The built validation framework and validation process are simple to use, are easily extendable when adding additional constraints and provide an update in logic to existing frameworks or solutions. More specifically, the validation framework creates a way to inject the validations and the validation process provides validation support as provided herein.

According to an embodiment, a data validation framework is created to validate data in a cloud service or a microservice environment or network. Data validation is used, for example, when a client or a user is accessing cloud-based services or applications. The services can be stored or accessed within a microservice platform or framework. A microservice framework may be structured with smaller independent architectural components that operate at high speed. Microservices allow applications to be managed easier and allow the applications to be scalable. The independent components in a microservice framework may perform focused operations and the other independent components in the same microservice framework may operate using differing technologies. The independent scalability of microservices allows a service to offer multiple cloud-based products using a larger number of resources.

Many microservice frameworks operate using a container-based infrastructure. Containers may include isolated infrastructures that use a minimal amount of resources, share a host operating system and are simple to integrate. Containers also allow for minimal software configuration since the container may use, for example, the same software code in a delivery pipeline. A differing container may operate within the same microservice framework and operate on an alternate software code with minimal configuration. An application program interface (API) may include a set of functions or a communication protocol that allows, for example, the container to access data on a virtual machine, an operating system, a service or an application.

Data validation may include, for example, REST parameters validation, such as a whitelist, string data, numeric data or instances or a regular expression (RegEx) in a method syntax. A method syntax may include a number and a type of input and output for a function. Regular expressions may be used, for example in a JSON schema, to express constraints. A schema, generally, may be a database structure that defines fields in a database or relationships between fields in a spreadsheet, such as in a relational database. A JSON schema may be a spreadsheet used to describe data formats or to validate data. A JSON schema may be used to ensure certain criteria is met when transmitting data or validating data. For example, the schema validates data being transmitted between users and services or service applications by asserting constraints on the data. A validation constraint, for example, may include an input to only have a certain number of characters or numbers, such as a phone number can only have the numbers 0-9.

An input payload or a payload validation may be used based on the schema. A payload may include, for example, the data packet, the request packet or the request content in REST. The payload may include the request content that is sent when making an API request to a server. The payload may be required to be validated based on the schema.

For example, REST API and JSON structured data are widely used industry standards for data exchange. REST is a lightweight data transfer that can work well with small datasets payloads. Other formats that may be used include, for example, comma-separated values (CSV), YAML or a spreadsheet. REST is also fast, utilizes less bandwidth and has a high-performance caching mechanism. JSON includes data that has a structure that is easy to use, is readable, is lightweight, provides fast data processing, is understandable to most programming languages and has a wide range of supported browser compatibility. JSON REST may provide support for many different types of clients, including browser clients. JSON REST is also extensively used in microservice architecture.

Custom validations may be used and may be injectable at runtime. Security compliance validations may also be used and may be provided by, for example, response encoding. Response encoding may include a response that is fetched from an external source. Extended support for encoding may include, for example, extended characters used for encoding. Security compliance validations may ensure that no additional scripts or content is added in a request or response. The request or response may be passed through a validation layer, such as a JSON sanitizer, and the validation layer may properly format the JSON. For example, single quoted strings are converted to JSON strings and the JavaScript® (JavaScript and all JavaScript-based trademarks and logos are trademarks or registered trademarks of Oracle Corporation and/or its affiliates) style line and block comments are removed. The JSON sanitizer may fix the punctuation, end quotes, mismatched brackets or missing close brackets. If an input contains only white space, then the valid JSON string 'null' is substituted.

Input size of the request payload may be measured by the validation framework. Security compliance may also be considered based on the input size of the request payload. Security compliance validations may also ensure that additional fields are not accepted in the REST API that are not in an understandable from, for example, QueryParam, headers or in a payload. Fetching only the required fields may remove unwanted data (e.g., junk data) sent along with the request. Continuous wrong hits within a short period of time may need to be addressed with or notification provided to, for example, an administrator of the application since there would be a chance that an unauthorized user (e.g., a hacker) may be attempting to access the application. For example, if the API is receiving many hits or invalid requests in a short time period that have validation errors and the requests are rejected, then the administrator may be notified.

Machine learning models may be used to generate one or more schemas. Schemas may be constraints used to validate data and to verify that certain criteria is met before transferring data. The data accessed for training and testing models may be considered input data or real data. For example, real data or input data for a healthcare application in a medical domain are patient healthcare records which may be current patient records that have been entered previously into healthcare record database with updates over time. The input data may include data attributes to the target types. For example, the input may include the input data field for the given data model and the target may include the constraint or the schema for the data field.

An example of input data used for training, testing and validating models may, for example, be split, partitioned or broken up into 3 parts. For instance, 65% of the data is used for training the model, 20% of the data is used for validating the model and 15% of the data is used for testing the model. Models may be updated and re-validated in the validation phase. Additionally, to provide the best results for a model training, testing and validation processes, it is best not to use the same model training data with the model validation phase or the model testing phase.

The model may be trained to predict data schema for a given data model. A given data model may, for example, be a person, a client or a medical record. The model may be trained to build a default model schema and to improve the model schema over time. Machine learning may also be used to manage versioning REST APIs automatically. By creating a model schema, for example, mobile device management products, additions or extensions may be managed automatically. For instance, when a code is updated and a new REST API version is created, then there may not be a need or there may not be a requirement to implement a validation again.

According to an embodiment, various types of machine learning models may be built and used to create predictive results for constructing schemas for services or microservices computing applications. Data or information from different domains that provide services and microservices may be obtained to build or predict schemas. Domains may include, for example, retail, entertainment, social media, business, technology, medical, academic, government, industrial, food chain, legal or automotive. Machine learning models may also include deep learning models and artificial intelligence. Training and updating a machine learning model may include supervised, unsupervised and semi-supervised machine learning procedures. Supervised learning may use a labeled dataset or a labeled training set to build, train and update a model. Unsupervised learning may use all unlabeled data to train a model. Semi-supervised learning may use both labeled datasets and unlabeled datasets to train a model.

Supervised learning and semi-supervised learning may incorporate feedback or ground truth by having an individual check the accuracy of the data, data labels and data classifications. Individuals are typically a subject matter expert who has extensive knowledge in the particular domain of the dataset. The subject matter expert input may represent ground truth for the machine learning model and the provided ground truth may raise the accuracy and the predictive capabilities of the model. The subject matter expert may correct, amend, update or remove the classification of the data or data labels by manually updating the labeled dataset. Using a subject matter expert to provide feedback to the model may improve the accuracy of the model as datasets are updated or corrected.

According to an embodiment, the supervised or semi-supervised machine learning may be used to allow an individual (e.g., a user, an expert or an administrator) to have some improving effect over the training of a model by having the ability to validate, alter, update or change the training set. Experts may provide input or feedback into a model by altering the training set as opposed to an unsupervised machine learning environment, when a user may not provide input to the data. The training set of data may include sample data or a label for learning purposes and a supervised or semi-supervised machine learning environment may allow the user to update the labels or classifiers of the training set.

Referring to FIG. 1, an exemplary networked computer environment 100 in accordance with one embodiment is depicted. The networked computer environment 100 may include a computer 102 with a processor 104 and a data storage device 106 that are enabled to run a software program 108 and a data transfer validation program 110a. The networked computer environment 100 may also include a server 112 that is enabled to run a data transfer validation program 110b that may interact with a database 114 and a communication network 116. The computer 102 may also be known as a client computer and the server 112 may also be known as a server computer. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The computer 102 may communicate with the server 112 via the communications network 116. The communications network 116 may include connections, such as wire, wireless communication links, or fiber optic cables. As will be discussed with reference to FIG. 5, server 112 may include internal components 902a and external components 904a, respectively, and computer 102 may include internal components 902b and external components 904b, respectively. The server 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the data transfer validation program 110a, 110b may interact with a database 114 that may be embedded in various storage devices, such as, but not limited to a computer/mobile device 102, a server 112, or a cloud storage service.

According to the present embodiment, a user operating a computer 102 or a server 112 (e.g., a server computer) may use the data transfer validation program 110a, 110b (respectively) to validate data in a cloud computing environment or a microservices environment. The data transfer validation method is explained in more detail below with respect to FIGS. 2-4.

Figure 2:
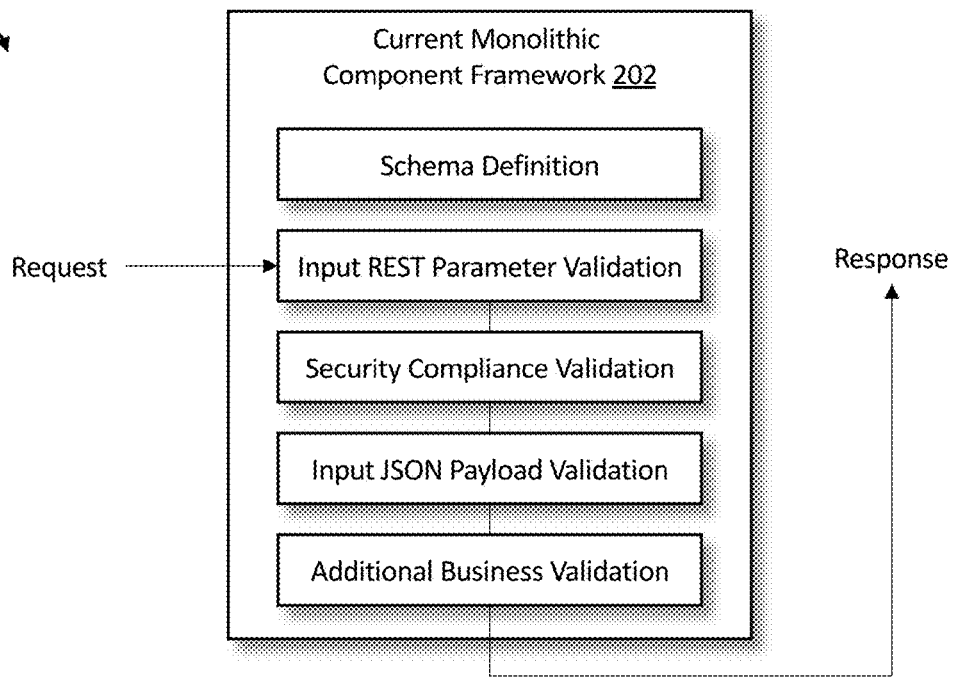
FIG. 2 are block diagram examples of a monolithic framework and a solution to a monolithic application framework according to at least one embodiment.
Figure 2:
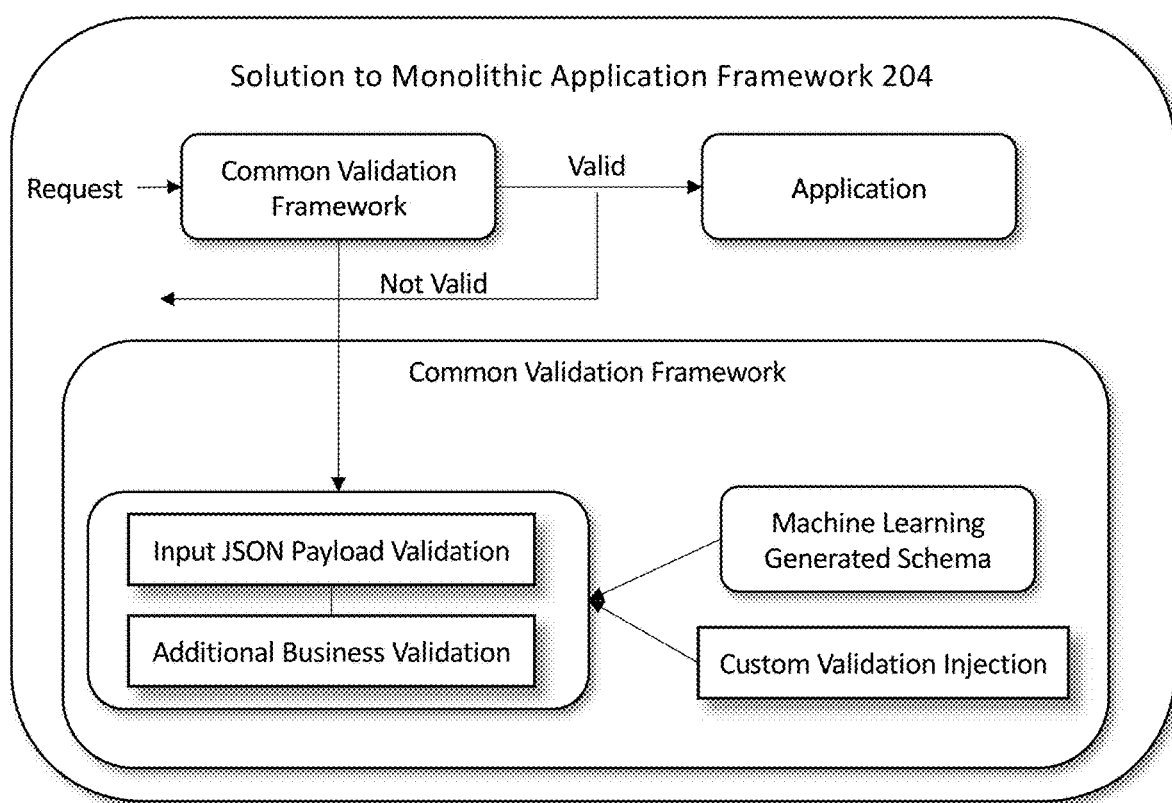

Referring now to FIG. 2, block diagram examples of a monolithic framework and a solution to a monolithic application framework used by the data transfer validation program 110a, 110b according to at least one embodiment is depicted.

A current monolithic component framework 202 or a monolithic application may include a schema definition that is a JSON schema used to validating data. Upon receiving a request from the current monolithic component framework 202, an input REST parameter is validated, a security compliance is validated, an input JSON payload is validated and an additional business parameter is validated before a response is provided. For example, the schema may be defined by the application programmer. The input REST parameter validation may include validating, for example, path, query or header parameters. The security compliance validation may validate a request for any script injection or a request for additional undefined inputs. The input JSON payload validation may validate a request body as per the schema or as defined by the schema. The additional business parameter may include any custom validation injection that are injected at runtime as per the business requirements. A custom validation may include, for example, a custom business validation that includes additional validations at runtime, such as an online shopping website identifying and verifying if a customer logging into the shopping website is a regular customer that an offer may presented to. The monolithic application may have a version management component that allows an implementation of new versions if some of the APIs implement new versions. For example, if a few of the APIs implement new versions of the application software within the microservices, then all of the APIs will need to implement the new version also.

A microservice environment may implement many microservices that operate the same as the monolithic application and each microservice (e.g., MS-1, MS-2 and MS-3) may follow the same process and same framework as the current monolithic component framework 202, such that after a request, a schema is defined, the input REST parameter is validated, the security compliance is validated, an input JSON payload is validated and an additional business parameter is validated before a response is provided. For example, MS-1 receives the request, and the MS-1 response is transmitted to MS-2 as an internal request. The response of MS-2 is transmitted to MS-3 as an internal request. The response of MS-3 is transmitted to MS-2. The response of MS-2 is transmitted to MS-1 and the response of MS-1 is transmitted out of the microservice environment, such as to a user, a client or another application in a cloud environment.

A solution to the monolithic application framework 204 may include a common validation framework and an application. The common validation framework or the validation framework may include an input JSON payload validation component, an additional business validation component, a machine learning generated schema and a custom validation injection component. The common validation framework may be a common library across the microservices that every microservice must pass through. For example, every microservice's incoming request must pass through the common library or the common validation framework to proceed. The application can be a microservice or a group of microservices.

The input JSON payload validation in the validation framework may include an input REST request body validation as defined by the schema. The additional business validation component in the validation framework may include any custom validation injections that may be injected at runtime as defined by business requirements. The machine learning generated schema may be used and may be validated if the input request is missing or does not contain a schema. The custom validation or a custom business validation may be injected at runtime. Validation may also be switched across multiple REST API versions using version support. Version support may include support for validation using JSON schema changes.

The solution to the monolithic application framework 204 may include switches or knobs at each point that may be turned on or off. For example, switches may be at points like at the common validation framework, the custom validations and any other business validations. A data transfer validation program 110a, 110b may be used with the solution to the monolithic application framework 204 to avoid repetitive validations in microservices architecture. Each microservice may handle validation requirements for the particular services required part of the validation and then notify the next microservice about the validations that have been validated up to this point in the process. Thus, avoiding repetitive validations will save validation time and validation costs from the further microservices in the path.

For example, there are three microservices, MS-1, MS-2 and MS-3. When a request is transmitted to MS-1, then internally MS-1 calls MS-2 and MS-2 calls MS-3. In a typical scenario, if the input request data is common for all three internal MS calls, then validation is usually processed by all three microservices. Alternatively, a data transfer validation program 110a, 110b may share the validation status across each of the microservices. If MS-1 validates the input data and MS-2 has a trusted relationship with MS-1, then MS-2 can skip the validation and save time and cost.

Figure 3:
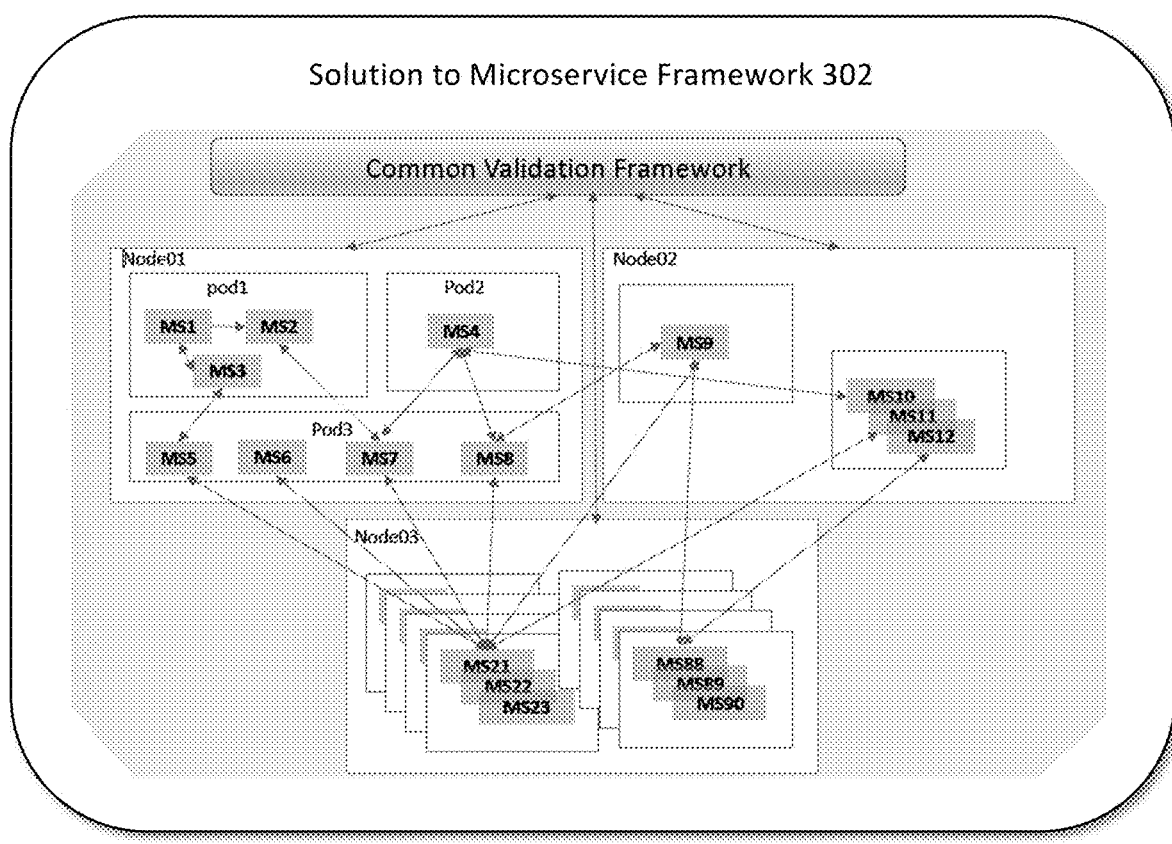
FIG. 3 is a block diagram example of a solution to a microservice framework according to at least one embodiment.

Referring now to FIG. 3, a block diagram example of a solution to a microservice framework used by the data transfer validation program 110a, 110b according to at least one embodiment is depicted.

The solution to a microservice framework 302 may include a common validation framework or validation framework that sends and receives data to and from one or more nodes. The nodes represent a virtual system or a physical system where a set of pods or containers are located. Within the nodes, one or more pods exist. The pods may represent a service that may include one or more microservices.

The common validation framework in the solution to the monolithic application framework 204 and the common validation framework in the solution to the microservice framework 302 may be the same common validation framework and may be used in both the monolithic and the microservice architectures. The common validation framework in the microservice framework 302 may be operated with more complexity than in the monolithic application framework 204. The common validation framework may be created as a common library that may be used as an entry point for each microservice. Alternatively, the common validation framework may be implemented as a separate microservice.

An example of implementing data validation using the solution to the microservice framework 302 includes a request from a first microservice to a second microservice, MS-1 to MS-2, respectively. Upon receiving the request, MS-2 may return a response to MS-1 with proper error codes or MS-2 may return a response to MS-1 after continuing further processing of the request. The process may include MS-2 receiving a valid message from a common validation framework that the request is from a trusted source, and thus, MS-2 may continue processing the request. Alternatively, MS-2 may receive a not valid message from a common validation framework and then respond to the request with a proper error code.

Figure 4:
FIG. 4 is an operational flowchart illustrating a process for data validation in a microservice environment according to at least one embodiment.

Referring now to FIG. 4, an operational flowchart illustrating the exemplary data validation process 400 used by the data transfer validation program 110a, 110b according to at least one embodiment is depicted.

At 402, machine learning is used to generate a schema. The schema that is generated using machine learning takes input data and trains the model that will generate a schema. The input data may include real data samples, current data or historical data, or both. A real data sample may include a spreadsheet that represents data from a domain that contains client information. For example, input data may include patient records and the model is trained to generate an appropriate schema for the input request. The real data sample used for training may be obtained from, for example, a patient record history data. The current data may include ongoing record data. The historical data samples may include all possible types of real or practical data associated with, for example, one or more patients. Any additional information or data may be used as input data that is transmitted along with the patient's record as an addition or an extension. The schema may be updated and validated accordingly based on additional or updated information. The model may predict the schema for the given data model using input data and the model may improve the schema over time using additional or updated data.

Data may be classified when training the model. For instance, the data used to train a model may include sample data, such as a spreadsheet containing multiple columns and rows representing data from various domains. The columns can include names, ages, birth dates, email addresses, telephone numbers and addresses of a group of people. The input data or sample data may be classified as different known attribute types. For example, if column 1 represents a name, column 2 represents a number, column 3 represents a date of birth, column 4 represents a passport number, column 5 represents an email address, column 6 represents a telephone number, column 7 represents part of an address, column 8 represents part of an address and column 9 represents some number. Here, the data samples are used to train the model to classify the data into different types of data and to generate constraints. Machine learning based validation may be used with data classification and constraint generation. For example, a column or a field that is classified as a phone number, a constraint may be generated such that the input value contains only numbers and is 10 digits.

Generating constraints of the input data or sample data may be used to limit the data or analyze a portion of the data. Models may be trained to predict the data schema, including the type of data or the nature of the data, or both. For example, whether the data is required, not required, a RegEx pattern or a whitelist. The more complete the data is, the likely that the amount of mandatory data for analysis increases. For example, if the data is 90% complete in the in column 4, the column that represents a passport number, then the field is defined to be a mandatory field. Further, if the field has only alphabet characters, such as a name, then the RegEx can be defined as [a-z, A-Z]*.

An example using the name column, column 1, the column is a string pattern, is a mandatory field and the column is not required to be unique (i.e., does not need to be a primary key in the database). A predication may be optionally made to decide the minimum and the maximum length of the string. Thus, a generated constraint may be represented as follows:

```
:"name": {
    "type": "string",
    "required": true,
},
```

An example using the date of birth or age column, column 3, the column is an integer type and the columns is a non-mandatory field. A prediction may be optionally made to decide the minimum and maximum range. The decision relating to the minimum and maximum range may be duplicated (i.e., not a primary key), thus, multiple records can have the same value. A constraint may be represented as follows:

```
:"age": {
    "type": "int",
    "required": true,
},
```

The model may be trained to learn to find the pattern in the input sample data that is provided. The model may be built or generated to predict the schema for the given data model. The output of the trained model may be a generated JSON schema that may be analyzed and updated over time. For example, the model may take the input fields as a JSON with record values or the constraints defined as the input and generate a JSON schema as a target or output. The data transfer validation program 110a, 110b may leverage the model to create a basic schema structure and to improve the schema based on the real data provided to it.

According to an alternate embodiment, improved schemas may be used to automate or manage updating the schema versions. For example, the improved schemas are used for the versioning of the JSON schema and the REST services.

According to an alternate embodiment, a machine learning based validation model or a data transfer validation program 110a, 110b may have sufficient switches to turn on or off. Multiple configurations may be used to configure the process effectively. For example, a particular type of constraint validation can be accepted if the machine learning validation accuracy is more than 80%, 90%, or an alternative percentage value. If the data is, for example, 70% complete, then the machine learning validation accuracy of more than 90% may be considered valid.

At 404, application configuration validations are performed. The application configuration validations are performed based on processing an application request, such as when an application receives a REST input request. For example, a REST request is processed and validated when an authorized user accesses an application for a microservice using authorization details, such as a username and a password. Application configurations may include common application validations, custom application validations or any other business validations. The application may initially check and verify if a validation switch is on or off. The switch validation may be then transmitted for validation purposes.

At 406, application validations are identified. The data transfer validation program 110a, 110b may identify or determine if the application validations are enabled or disabled. The switches that are verified or not verified based on the application configurations at step 404 may be identified, such as using a configuration file or an API. For example, basic validation enabled=true, and custom validation enabled=false. For this example, since the custom validation is false, no custom validations will be processed. If the custom validation was true, then custom validations may be identified and processed.

For example, based on the validation switches, if the application validation is enabled, then a request to a common validation framework is transmitted via a request packet with the validation information. Alternatively, if validation is not enabled or required, the request processing continues to the common validation framework or the validation framework without the request validation steps. For example, some REST requests may be internal microservice to microservice requests that may not need any validation to be applied, thus, the validation step here may be disabled.

If one or more validation switches are switched on, such as the basic validation=enabled, then the request from step 404 may be transferred to the common validation framework or the validation framework to validate the request parameters and the request payload. For example, an individual record is transmitted with the query or path and the header parameters to the validation framework. An alternate example may include a type of person or individual is transmitted with the local value and the header parameters to the validation framework. The local value information may be passed in the header, which may indicate that the response is expected in a specific requested language.

At 410, the data transfer validation program 110a, 110b determines if the schema is defined. The determination to identify if a schema is defined may include receiving one or more constraints with the request. The schema constraints may be used for validation purposes within the validation framework. For example, for every request payload to be validated, the validation framework may also accept the schema as an input. If the schema or schema input is missing or not identified, then the schema is undefined. If the schema is undefined, then the machine learning generated schema may be used at 412.

If the data transfer validation program 110a, 110b determines that the schema is not defined at 410, then a machine learning generated schema is used at 412. If no constraints are identified or defined at step 410, then the data transfer program 110a, 110b may use the machine learning generated constraints or schema. The machine learning generated constraints may be based on the training data and the generated constraints from step 402 and may be used for validation within the validation framework. If any additional updates are made to the machine learning algorithm, the corresponding schema may also automatically be updated based on the model update. The machine learning generated schema may be used for validation purposes and then the whitelist validation may be performed at 414.

If the data transfer validation program 110a, 110b determines that the schema is defined at step 410 or the machine learning generated schema is available at 412, then the whitelist validation is performed at 414. If a schema has been defined, then the defined schema is used for validation purposes. Alternatively, if a schema was not defined, then the machine learning generated schema from step 402 may be used for validation purposes.

A whitelist validation may include validating the request parameters that are defined on the allowed list or the whitelist. A whitelist validation may be one constraint being created based on the request. For example, a record type for a patient with a doctor or medical facility or a client locale.

At 416, a custom injectable validation is performed. The custom injectable validation may include any additional validation that is defined. For example:
validation:
enabled: true
isCommonValidationEnabled: true
isCustomInjectableValidationEnabled: true.

At 418, schema-based validation for a payload is performed. The schema-based validation may include validating the request payload based on the defined schema. For example, validating if the input patient record has a name and contact information, such as an address or other details as per the defined schema of the patient. Annotations may define the constraint for a request payload schema and the constraints may be customizable again at runtime. An annotation based common validation framework may be easily extendable to add additional constraints or to update the logic. For example, an annotated flexible or extendable generic validation framework may be used across multiple services. The generic framework may cover whitelist, regEx, schema, security encoding types of constraints.

At 420, a custom schema injectable validation for a payload is performed. The custom schema injectable validation may include JSON, CSV or a spreadsheet formatted data. For example, an input query value record is type=patient and the constraint on the record could include a record type as a whitelist between a patient and the patient's doctor. A payload constraint may be defined in the schema. Custom injectable constraints may be used for all types of constraints, such as whitelist, regEx and schemas.

Custom constraints may only be injected if the constraint is defined as overridable. For example, some input types may not be allowed to update constraints at runtime, such as a length of an input parameter. If some input types are allowed to be set or updated at runtime that should not be set or updated at runtime, then hackers may programmatically attempt to update the input parameter to a very large value that can cause the application to get stuck at runtime. Some input parameters for custom constraints may be defined as overridable may be allowed to be updated during runtime with considerably no harm. Any constraint may be configurable to be overridden or not overridden. If the configuration is set to override the constraint, then any custom injection of validation constraint may be allowed at runtime. The version of the API may specify which version of a REST API is applicable and the value * may denote applicability to all versions of the APIs available.

According to an alternate embodiment, a data transfer validation program 110a, 110b may also provide data governance for regulatory compliance. For example, consensus may be checked before the JSON data is approved as validated. Data governance for a regulatory compliance, for example, the general data protection regulation (GDPR) or the California Consumer Privacy Act (CCPA), may require, use or include additional constraints in the validation, such as checking the availability of a consensus by a data owner. Sensitive information or personal data of a user may be kept private and not shared with particular applications unless consent exists and are in place by a data owner. A validation framework may be created to add one or more new constraint types in the post-validation module. For example:

@validation.post ( consent = @Encoding(key="response", value="<consent_management_system>")).

Where the consent details may be fetched using the provided or given consent management system. If the response data is agreed to be shared with the requested source by the corresponding data owner, then the response is successfully sent, or else an appropriate validation error is provided.

A data monitoring application sample may be provided of metrics of a complete table that shows the higher the validation percentage that is provided, the quality of the data increases.

| Sources | Data Model | Data Completeness | Validation Accuracy | Data Quality Trust Score | Total DQ Score |
| --- | --- | --- | --- | --- | --- |
| Source1 | Field1 | 10% | 100% | 1000 | 3900 |
| | Field2 | 0% | 0% | 0 | |
| | Field3 | 100% | 70% | 7000 | |

-continued

| Sources | Data Model | Data Completeness | Validation Accuracy | Data Quality Trust Score | Total DQ Score |
|---|---|---|---|---|---|
| | Field4 | 70% | 100% | 7000 | |
| | Field5 | 50% | 90% | 4500 | |
| Source2 | Field1 | 100% | 100% | 10,000% | 4275 |
| | Field2 | 20% | 80% | 1600 | |
| | Field3 | 0% | 0% | 0 | |
| | Field4 | 30% | 50% | 1500 | |
| | Field5 | 80% | 50% | 4000 | |
| Source3 | Field1 | 60% | 100% | 6000 | 8860 |
| | Field2 | 90% | 100% | 9000 | |
| | Field3 | 95% | 100% | 9500 | |
| | Field4 | 99% | 100% | 9900 | |
| | Field5 | 100% | 99% | 9900 | | where the field data quality (DQ) score is calculated by, field DQ score=(Wgt1+Data Completeness)*(Wgt2+ Data Validation Accuracy), where wgt is the weight applied for the particular field and the amount of weight may be added during the matching process. Weights may be generated using, for example, the historical sample data. The source data quality (DQ) score is calculated by, DQ score=(Fld1DQ score+Fld2DQ score+ . . . FldN DQ score)/N, where N is the number of fields in the data model. The data quality score for any source may provide the confidence to trust a source and may be useful for data governance.

An example of the validation process between steps 414-420 is represented below. The example shows that the configuration switches are set and the basic validation constraints that are defined in the API or the method syntax using annotations.

```
@Validator.Pre (
   whitelist = { @Whitelist(key = "pretty_format", values = { "true","false" }, caseSensitive
      = false, defaultValue = "false", required = true, overridable = true,
      version = "*")
   },
   textFlds = { @TextRegex(key = "target", value = "[a-zA-Z0-9]*", required = true,
      overridable = false, version = "*")
   },
   numFlds = { @NumRegex(key = "offset", value = "[0-9]*", min = 0, overridable = false,
      required = true, version = "*")
   },
   payload = @Payload(key = "request", value = "algorithm_schema.json", version = "")
)
```

Then the custom validations may include the constraints that are injected later during runtime either through a configuration file or programmatically inserted. The response may include:

```
@Validator.Post (
   ResponseEncoding = @Encoding(key="response", value="OWASP_json_sanitizer")
).
```

It may be appreciated that FIGS. 2-4 provide only an illustration of one embodiment and do not imply any limitations with regard to how different embodiments may be implemented. Many modifications to the depicted embodiment(s) may be made based on design and implementation requirements.

Figure 5:
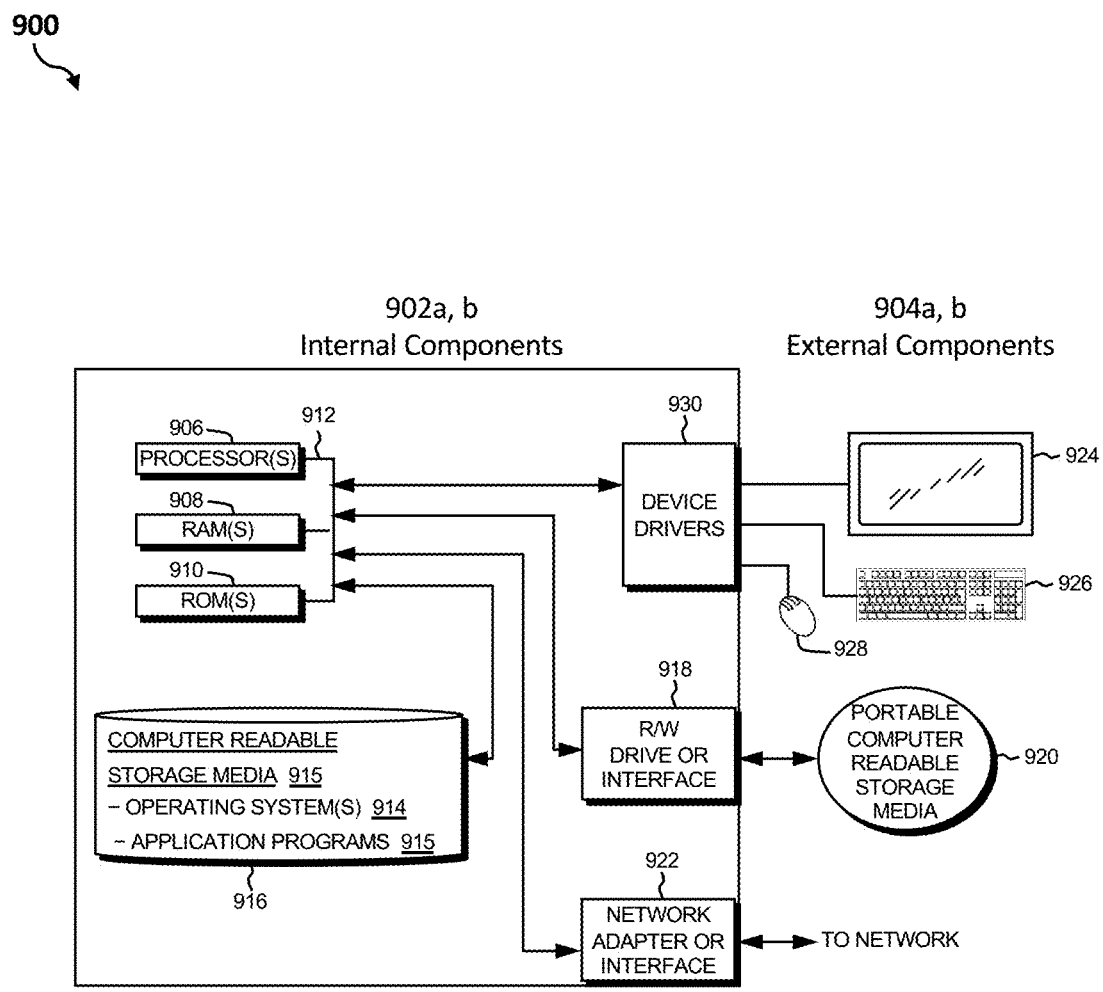
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computer 102 and server 112 may include respective sets of internal components 902a, b and external components 904a, b illustrated in FIG. 5. Each of the sets of internal components 902a, b includes one or more processors 906, one or more computer-readable RAMs 908 and one or more computer-readable ROMs 910 on one or more buses 912, and one or more operating systems 914, with one or more application programs 915 and one or more computer readable storage media 915. The one or more operating systems 914, the software program 108, and the data transfer validation program 110a in client computer 102, and the data transfer validation program 110b in network server 112, may be stored on one or more computer readable storage media 915 for execution by one or more processors 906 via one or more RAMs 908 (which typically include cache memory). In the embodiment illustrated in FIG. 5, each of the computer readable storage media 915 is a magnetic disk storage device of an internal hard drive. Alternatively, each of the computer readable storage media 915 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the data transfer validation program 110a, 110b can be stored on one or more of the respective portable computer-readable tangible storage devices 920, read via the respective RAY drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G/4G/5G wireless interface cards or other wired or wireless communication links. The software program 108 and the data transfer validation program 110a in the computer 102 and the data transfer validation program 110b in a network server 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the data transfer validation program 110a in computer 102 and the data transfer validation program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including networks, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
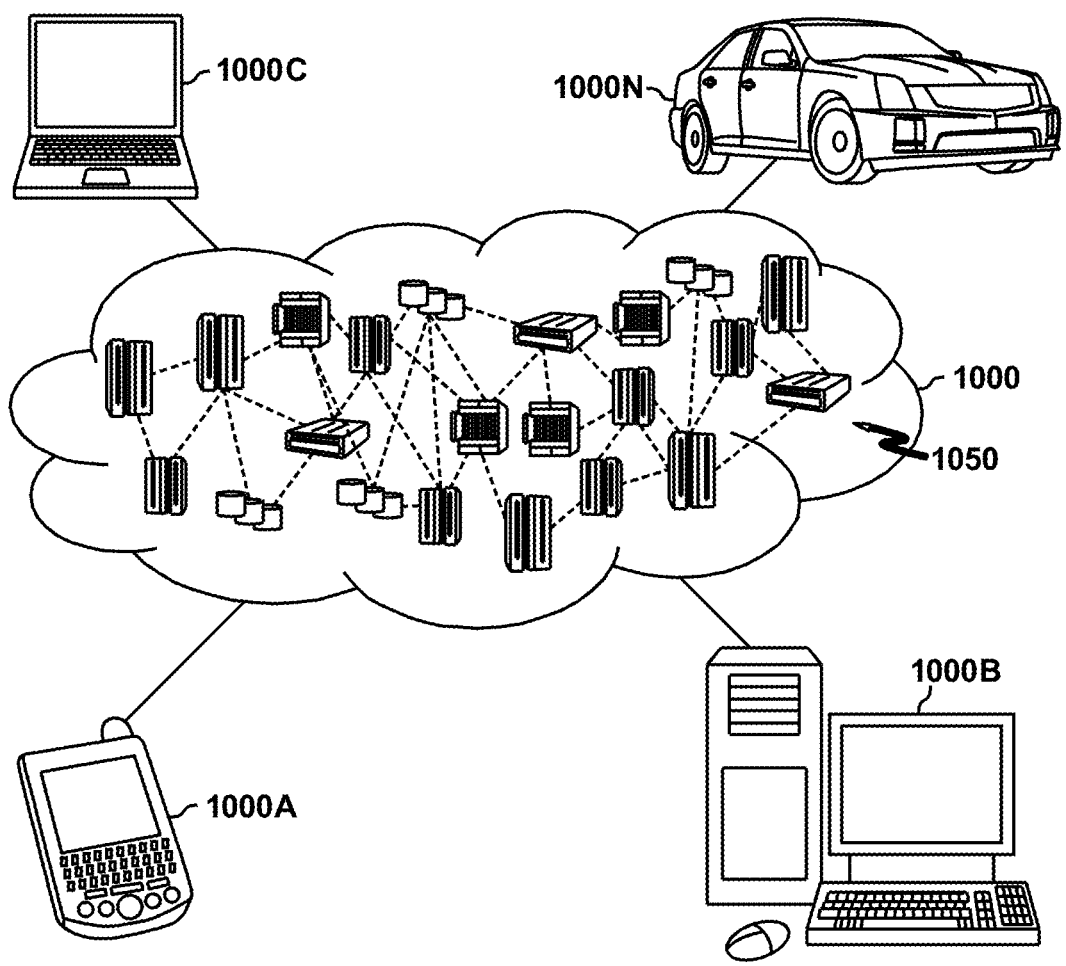
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, the cloud computing environment 1000 includes one or more cloud computing nodes 1050 with which local computing devices used by cloud consumers, such as, for example, personal digital assistant (PDA) or cellular telephone 1000A, desktop computer 1000B, laptop computer 1000C, and/or automobile computer system 1000N may communicate. Cloud computing nodes 1050 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 1050 and cloud computing environment 1000 can communicate with any type of computerized device over any type of network and/or network addressable connection (e.g., using a web browser).

Figure 7:
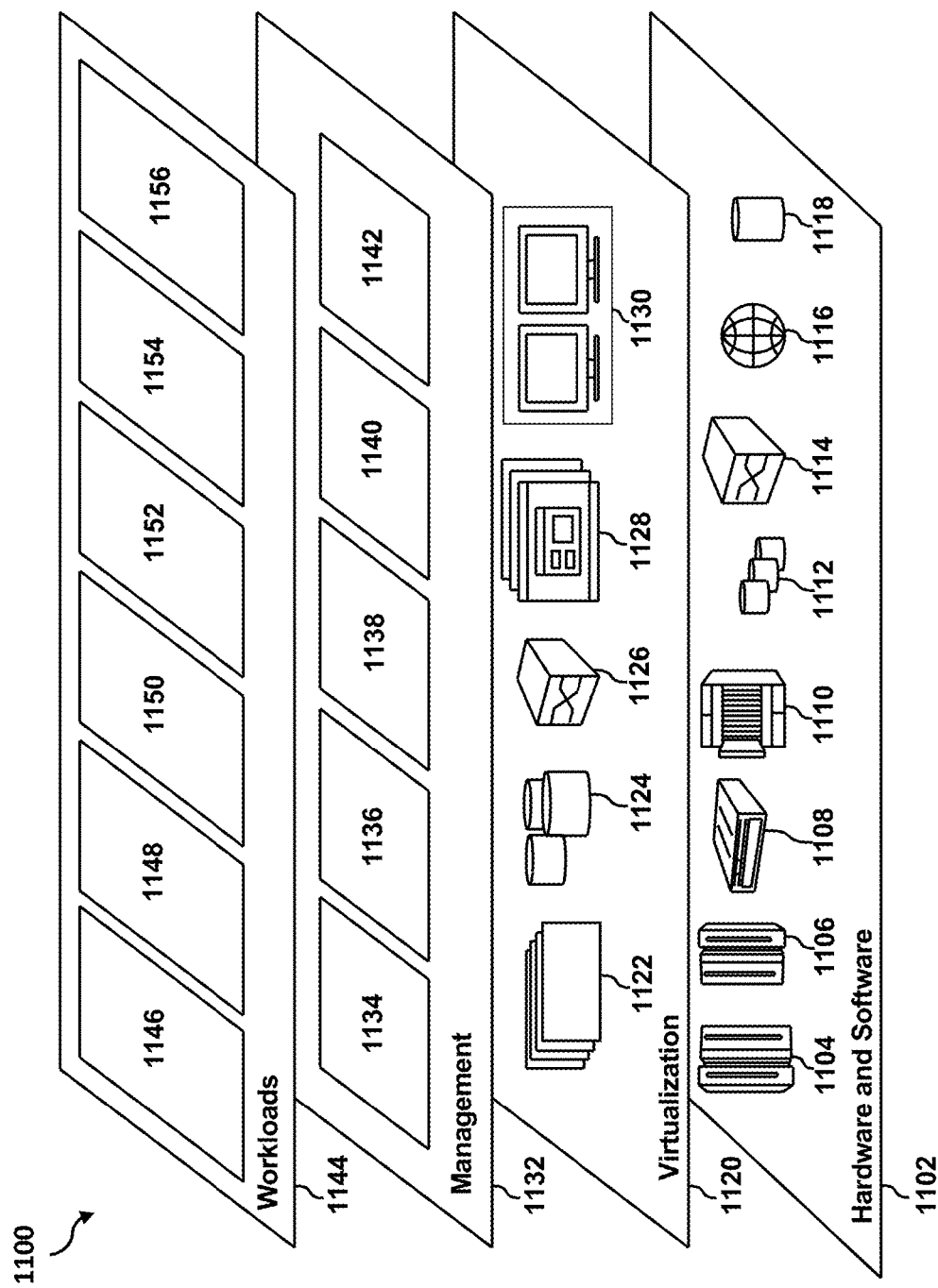
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

A hardware and software layer 1102 include hardware and software components. Examples of the hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, a management layer 1132 may provide the functions described below. Resource provisioning 1134 provides dynamic procurement of computing resources and other resources that are utilized to perform tasks within the cloud computing environment. Metering and pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions that may be provided from this layer include: mapping and navigation 1146; software development and lifecycle management 1148; virtual classroom education delivery 1150; data analytics processing 1152; transaction processing 1154; and data validation 1156. A data transfer validation program 110a, 110b provides a way to validate client data when transmitting responses and requests to and from a microservice framework in a cloud computing environment.

The present invention may be a system, a method, and/or a computer program product at any possible technical detail level of integration. The computer program product may include a computer readable storage media 915 (or media) having computer readable program instructions thereon for causing a processor 906 to carry out aspects of the present invention.

The computer readable storage media 915 can be a tangible device that can retain and store instructions for use by an instruction execution device. The computer readable storage media 915 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage media 915 includes the following: a portable computer diskette, a hard disk, a random access memory (RAM) 908, a read-only memory (ROM) 910, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage media 915, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage media 915 or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface 922 in each computing/processing device receives computer readable program instructions from the network and forwards the computer readable program instructions for storage in a computer readable storage media 915 within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor 906 of a general purpose computer, special purpose computer, or other programmable data processing apparatus to produce a machine, such that the instructions, which execute via the processor 906 of the computer or other programmable data processing apparatus, create means for implementing the functions/acts specified in the flowchart and/or block diagram block or blocks. These computer readable program instructions may also be stored in a computer readable storage media 915 that can direct a computer, a programmable data processing apparatus, and/or other devices to function in a particular manner, such that the computer readable storage media 915 having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving input data, wherein the input data is used to train, test and validate a machine learning model;
receiving a request based on an application configuration validation;
determining a request schema is undefined based on one or more constraints included with the request;
generating a schema using the machine learning model, wherein the schema generated by the machine learning model is a set of constraints based on the input data received;
using the schema generated by the machine learning model for a plurality of validations, wherein a validation status for each of the plurality of validations of a first microservice are shared across one or more additional microservices enabling the plurality of validations to be skipped for the one or more additional microservices;
updating the machine learning model based on updated input data or additional data received;
generating an updated schema using an updated machine learning model; and
using the updated schema for the plurality of validations.

2. The method of claim 1, further comprising:
performing the application configuration validation;
determining the application configuration validation is enabled; and
transmitting the request to a common validation framework.

3. The method of claim 1, wherein the plurality of validations further comprises:
performing a whitelist validation;
performing a custom injectable validation, wherein the custom injectable validation is performed upon determining that a constraint is defined as overridable;

performing a schema based validation for a payload; and
performing a custom schema injectable validation for the payload.

4. The method of claim 1, wherein the request is received by a validation framework that includes an input JSON payload validation component, an additional business validation component, the schema generated by the machine learning model and a custom validation injection component, wherein the validation framework is a common library that each incoming request received from each of a plurality of microservices must pass through.

5. The method of claim 1, wherein the set of constraints are generated by the machine learning model to reduce an amount of input data to be analyzed in generating the schema.

6. The method of claim 1, identifying mandatory data for analysis within the input data received based on a completeness of the input data for each attribute type.

7. The method of claim 1, further comprising:
generating one or more new constraint types in addition to the set of constraints generated by the machine learning model based on one or more rules for regulatory compliance.

8. The method of claim 1, wherein the machine learning model is trained according to semi-supervised machine learning procedures and wherein updating the machine learning model further comprises:
removing a data classification or a data label from a labeled dataset within the input data.

9. The method of claim 1, the first microservice is a trusted source and has a trusted relationship with each of the one or more additional microservices.

10. The method of claim 1, wherein the schema generated using the machine learning model is utilized in building a default model schema, wherein the default model schema is managed using the machine learning model to update versions of a representational state transfer (REST) application program interface (API) automatically such that there is no requirement to implement additional validations.

11. A computer system comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
receiving input data, wherein the input data is used to train, test and validate a machine learning model;
receiving a request based on an application configuration validation;
determining a request schema is undefined based on one or more constraints included with the request;
generating a schema using the machine learning model, wherein the schema generated by the machine learning model is a set of constraints based on the input data received;
using the schema generated by the machine learning model for a plurality of validations, wherein a validation status for each of the plurality of validations of a first microservice are shared across one or more additional microservices enabling the plurality of validations to be skipped for the one or more additional microservices;
updating the machine learning model based on updated input data or additional data received;
generating an updated schema using an updated machine learning model; and
using the updated schema for the plurality of validations.

12. The computer system of claim 11, further comprising:
performing the application configuration validation;
determining the application configuration validation is enabled; and
transmitting the request to a common validation framework.

13. The computer system of claim 11, wherein the plurality of validations further comprises:
performing a whitelist validation;
performing a custom injectable validation, wherein the custom injectable validation is performed upon determining that a constraint is defined as overridable;
performing a schema based validation for a payload; and
performing a custom schema injectable validation for the payload.

14. The computer system of claim 11, wherein the request is received by a validation framework that includes an input JSON payload validation component, an additional business validation component, the schema generated by the machine learning model and a custom validation injection component, wherein the validation framework is a common library that each incoming request received from each of a plurality of microservices must pass through.

15. A computer program product comprising:
one or more computer-readable tangible storage media and program instructions stored on at least one of the one or more computer-readable tangible storage media, the program instructions executable by a processor to cause the processor to perform a method comprising:
receiving input data, wherein the input data is used to train, test and validate a machine learning model;
receiving a request based on an application configuration validation;
determining a request schema is undefined based on one or more constraints included with the request;
generating a schema using the machine learning model, wherein the schema generated by the machine learning model is a set of constraints based on the input data received;
using the schema generated by the machine learning model for a plurality of validations, wherein a validation status for each of the plurality of validations of a first microservice are shared across one or more additional microservices enabling the plurality of validations to be skipped for the one or more additional microservices;
updating the machine learning model based on updated input data or additional data received;
generating an updated schema using an updated machine learning model; and
using the updated schema for the plurality of validations.

16. The computer program product of claim 15, further comprising:
performing the application configuration validation;
determining the application configuration validation is enabled; and
transmitting the request to a common validation framework.

17. The computer program product of claim 15, wherein the plurality of validations further comprises:
performing a whitelist validation;
performing a custom injectable validation, wherein the custom injectable validation is performed upon determining that a constraint is defined as overridable;

performing a schema based validation for a payload; and
performing a custom schema injectable validation for the payload.

18. The computer program product of claim 15, wherein the request is received by a validation framework that includes an input JSON payload validation component, an additional business validation component, the schema generated by the machine learning model and a custom validation injection component, wherein the validation framework is a common library that each incoming request received from each of a plurality of microservices must pass through.

* * * * *

UNITED STATES PATENT AND TRADEMARK OFFICE
CERTIFICATE OF CORRECTION

| | |
|---|---|
| PATENT NO. | : 11,853,272 B2 |
| APPLICATION NO. | : 17/249077 |
| DATED | : December 26, 2023 |
| INVENTOR(S) | : Pushpalatha M. Hiremath et al. |

It is certified that error appears in the above-identified patent and that said Letters Patent is hereby corrected as shown below:

On the Title Page

Item (72), Column 1 Line 4 Inventor name (Mark Wang) should be Ke Qing Wang

Signed and Sealed this
Third Day of September, 2024

Katherine Kelly Vidal
*Director of the United States Patent and Trademark Office*